US011358758B2

(12) United States Patent
Gavin et al.

(10) Patent No.: US 11,358,758 B2
(45) Date of Patent: Jun. 14, 2022

(54) CONTAINER LID (71) Applicant: Plastic Recovery Technologies, Corp., Holmes Beach, FL (US)

(72) Inventors: Kevin Gavin, Holmes Beach, FL (US); Razvan Stefanescu, Chicago, IL (US)

(*) Notice: Subject to any disclaimer, the term of this patent is extended or adjusted under 35 U.S.C. 154(b) by 0 days.

(21) Appl. No.: 15/016,792

(22) Filed: Feb. 5, 2016

(65) Prior Publication Data
US 2017/0225845 A1 Aug. 10, 2017

(51) Int. Cl.
*B65D 43/16* (2006.01)
(52) U.S. Cl.
CPC .................. *B65D 43/167* (2013.01)
(58) Field of Classification Search
CPC ..................................................... B65D 43/164
USPC ................... 220/836, 832, 826, 840, 831
See application file for complete search history.

(56) References Cited

U.S. PATENT DOCUMENTS

| | | | |
|---|---|---|---|
| 4,158,424 A * | 6/1979 | Carmack | B65F 1/1646 220/826 |
| 4,450,976 A | 5/1984 | Snyder et al. | |
| 4,771,940 A * | 9/1988 | Taylor | B65F 1/16 220/832 |
| 4,949,866 A * | 8/1990 | Sanders | B65F 1/16 220/810 |
| 5,071,024 A * | 12/1991 | Delmerico | B65D 43/24 220/832 |
| 5,217,136 A * | 6/1993 | Sanden, Jr. | B65F 1/1646 220/836 |
| 5,564,586 A * | 10/1996 | Goodwin | B65F 1/1646 16/DIG. 13 |
| 6,036,049 A * | 3/2000 | Hwang | B65D 43/164 220/826 |
| 6,050,442 A * | 4/2000 | Wysocki | B65F 1/004 220/524 |
| 6,053,354 A * | 4/2000 | Niemeyer | B65F 1/1473 220/819 |
| 6,321,923 B1 | 11/2001 | Wood | |
| 6,883,191 B2 | 4/2005 | Gaboury et al. | |
| D513,179 S | 12/2005 | Gavin et al. | |
| 7,100,791 B2 | 9/2006 | Berger | |
| 7,731,042 B2 | 6/2010 | Blomdahl et al. | |
| 7,784,642 B2 | 8/2010 | Gavin et al. | |
| 2003/0146230 A1* | 8/2003 | Eaton | B65F 1/16 220/826 |
| 2003/0213808 A1* | 11/2003 | Berger | B65F 1/1473 220/832 |

(Continued)

*Primary Examiner* — J. Gregory Pickett
*Assistant Examiner* — Niki M Eloshway
(74) *Attorney, Agent, or Firm* — Stonebridge IP, PLLC (57) ABSTRACT

The invention teaches a container lid product for controlling access to a container. The container lid comprises one or more hollow molded hinges with solid compressed area to eliminate any seam in use pivotally connecting the product to the container, a hollow-molded edge disposed adjacent to the one or more hollow-molded hinges, and a single-walled cover portion being connected to the hollow-molded edge. The single-walled cover has a length and a width and comprises a plurality of ribs extending the length of the single-walled cover. The single-walled cover has a peripheral rim with an undercut for stiffening. Each the one or more hollow molded hinges comprises an elongate knuckle. The hollow-molded edges comprises a top layer and a bottom layer.

8 Claims, 10 Drawing Sheets

(56) References Cited

U.S. PATENT DOCUMENTS

| | | | |
|---|---|---|---|
| 2005/0224507 A1* | 10/2005 | Gavin | B29C 67/0044 220/836 |
| 2009/0206095 A1* | 8/2009 | Overath | B65D 81/3816 220/592.25 |
| 2011/0036853 A1* | 2/2011 | Ramsey | B65D 1/22 220/810 |
| 2015/0108154 A1* | 4/2015 | Greenberg | B65D 43/06 220/826 |

* cited by examiner

CONTAINER LID

FIELD OF THE INVENTION

The invention pertains generally to plastic lids for public refuse containers and more particularly to a ruggedized plastic container lid having a hollow-molded hinge, a double walled hinge portion, and a single walled cover portion.

BACKGROUND OF INVENTION

The invention is a ruggedized, lightweight, molded container lid product and a method for manufacturing the ruggedized, lightweight, molded container lid product. The product can be used on various containers; for example, waste containers, dumpsters, recycling bins, and various other containers that utilize pivotally connected lids to block a container opening.

A container lid can be used to restrict access to container contents and to prevent rodents and other animals from disturbing and removing container contents. The container lid also provides protection from wind, precipitation, and various other natural events that can disturb and contaminate the container contents. A pivotally connected container lid, especially when used on large containers such as dumpsters, can be sized to block large container openings. A user must lift the container lid to get access to the container opening.

It is advantageous for the container lid to be lightweight and rigid to facilitate the abovementioned functions and other functions. The product provides light weight and rigidity by utilizing the hollow-molded cover to restrict access to the container. Hollow-molded components can reduce weight and minimize material consumption by introducing significant voids inside the object. The combination of a doubled wall hinge-line and a single wall body can utilize features such as ribs, internal webs, gussets, and various other features to approximate the strength and stiffness of a similar-shaped solid-molded component.

However, there are applications where it can be clearly advantageous to utilize the full strength, stiffness, and wear resistance of a hollow-molded hinge with a solid seamless, compressed area. For example, a container lid can experience significant wear and abuse resulting from ordinary usage and extraordinary usage. Also, a standard container lid often fails and breaks where the lid connects to the container. Force and impact on the container lid can be transmitted to the container through a container lid where the lid is connected to the container. Sufficient force and impact can cause a standard container lid to break where the lid connects to the container.

The container lid product of the invention provides increased strength and wear-resistance where the product connects to the container by utilizing the hollow-molded hinge with a knuckle having a solid-molded protrusion to connect to the container. The container lid product of the invention provides light weight, rigidity, and increased ease of use by utilizing the hollow-molded cover connected to the hollow-molded hinge.

Most plastic container lids are formed as a single piece at a time in a mold. The single piece comes out of a mold substantially in its final form. This process is slow and inefficient. Plastic must be heated and inserted into a mold. The plastic is then forced into the desired shape and is cooled to a stiffened form. The formed piece is then removed from the mold to finish cooling. The invention improves the method of creating container lids through molding by permitting the formation of two lids simultaneously, effectively doubling the manufacturing rate of the lid.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention teaches a container lid product for controlling access to a container having a container opening, the product being pivotally connected to the container via a container feature, and the product in use pivoting between an open position and a closed position to control access to the container. The container lid comprises one or more hollow-molded hinges in use pivotally connecting the product to the container, a hollow-molded edge disposed adjacent to the one or more hollow-molded hinges, and a single-walled cover portion being connected to the hollow-molded edge.

The single-walled cover portion in use in the closed position blocks at least a part of the container opening. The single-walled cover has a length and a width and comprises a plurality of ribs extending the length of the single-walled cover. The single-walled cover has a peripheral rim extending vertically downward from the single-walled cover and a formed shape for lifting the container lid. The peripheral rim has a lip extending horizontally inward from the peripheral rim. The one or more hollow-molded hinges, hollow molded edge, and singled-walled cover being unitarily molded. Each the one or more hollow-molded hinges comprise an elongate knuckle. Each elongate knuckle has a substantially circular void extending through the length of the elongate circular pin. In addition, there is a solid-molded protrusion extending form the elongate circular pin. When in use the knuckle contacts the container feature.

The hollow-molded edge comprises a top layer, a bottom layer, and a void separating the top layer and the bottom layer. The top layer extends substantially from the single-walled cover. The bottom layer is disposed substantially planar with the peripheral rim of the single-walled cover. The void extends to abut the one or more hollow-molded hinges and terminates before extending into the one or more hollow-molded hinges.

In another embodiment each of the one or more hollow-molded hinges further comprises one or more wave protrusions extending from the one or more hollow-molded hinges. Furthermore, the hollow-molded edge may further comprise one or more tacks.

In another embodiment the container lid further comprises a second container lid simultaneously co-formed with the container lid. The second container lid comprises one or more second hollow-molded hinges in use pivotally connecting the product to the container, a second hollow-molded edge disposed adjacent to the one or more second hollow-molded hinge, and a second single-walled cover portion being connected to the second hollow-molded edge. The second single-walled cover portion in use in the closed position blocks at least a part of the container opening. The second single-walled cover has a length and a width and a plurality of ribs extending the length of the single-walled cover. The second single-walled cover has a second peripheral rim extending downward from the second single-walled cover and a formed shape for lifting the container lid. The one or more second hollow-molded hinges, second hollow-molded edge, and second singled-walled cover being unitarily molded. Each of the one or more second hollow-molded hinges comprise a second elongate knuckle. When in use the second knuckle contacts the container feature. The second hollow-molded edge comprises a second top layer, a second bottom layer, and a second void separating the second top layer and the second bottom layer. The second top layer extends substantially from the second single-walled cover. The second bottom layer is disposed substantially planar with the second peripheral rim of the second single-walled cover. The second void extends to abut the one or more second hollow-molded hinges and terminates before extending into the one or more second hollow-molded hinges. The peripheral rim of the container lid is connected to the second peripheral rim. The second peripheral rim has a second lip extending horizontally inward from the second peripheral rim. A void separates the single-walled cover portion and the second single-walled cover portion. The second hollow-molded edge of the second container lid is disposed at the opposite side of the length of the container lid from the hollow-molded edge of the container lid.

In another embodiment each of the one or more second hollow-molded hinges further comprises one or more second wave protrusions extending from the one or more second hollow-molded hinges. Furthermore, the second hollow-molded edge may further comprise one or more second tacks.

Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION OF THE PREFERRED EMBODIMENT

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

The generic name "plastic" will be used hereinafter to describe plastic, polymers, and various other synthetic and semi-synthetic materials that can be molded and extruded into components. Solid-molded, as used here and throughout, refers to a component produced by a process characterized by introducing the plastic into a solid-mold cavity and then causing the plastic to substantially wholly fill the solid-mold cavity. Hollow-molded, as used here and throughout, refers to a component produced by a process characterized by introducing the plastic into a hollow-mold cavity having a hollow-mold cavity surface and then causing the plastic to substantially wholly coat the hollow-mold cavity surface with a plastic layer having a wall thickness. Solid-molded components essentially have a single wall. Hollow-molded components have two walls with a hollow-mold cavity between the two walls.

In recent years, plastic container lids began to replace sheet metal container lids and lids made from other materials. Both solid-molded plastic container lids and hollow-molded plastic container lids can be found among the prior art. Hollow-molded lids are able to provide light weight, rigidity, and material savings by employing "box-like", rigid, thin-wall configurations that are possible utilizing the hollow-molding process. Solid-molded lids can be made with thick sections for additional strength. However, solid-molding processes are not well adapted for producing "box-like", rigid, thin-wall cross-sections. Solid-molded lids are typically heavy and flexible.

The product of the invention combines the strong, wear-resistant, and durable hollow-molded hinge with a solid-molded protrusion with the lightweight and rigid hollow-molded cover into a single, unitarily molded container lid product. The method of the invention provides a molding process for molding the container lid product.

The hollow-molded hinge with a solid-molded protrusion provides increased strength where the product connects to the container. The hollow-molded edge and singled-walled cover of the product provide light weight and rigidity for increased ease of use and decreased material consumption.

Hollow-molded container lids having hollow-molded hinges can be found among the prior art. Hollow-molded container lids with hollow-molded hinges can use various methods to improve the strength and wear resistance of the hinges. For example, hollow-molded lids have been modified by adding a separate, metal hinge tube to the hollow-molded hinge. This modification improves hinge strength and wear resistance but requires an expensive, secondary operation to add the tube. In addition, force and impact are still transmitted by the metal hinge tube through the thin-wall sections of the hollow-molded hinge.

Alternatively, some hollow-molded lids have been modified by adding a large plurality of hollow-molded hinge components so that each individual hinge component carries a small portion of the force and the impact transmitted from the lid to the container. However, these modifications fall short of the strength of the inventive hollow-molded hinge with a solid-molded protrusion because these modifications cannot provide maximum hinge durability.

Figure 1:
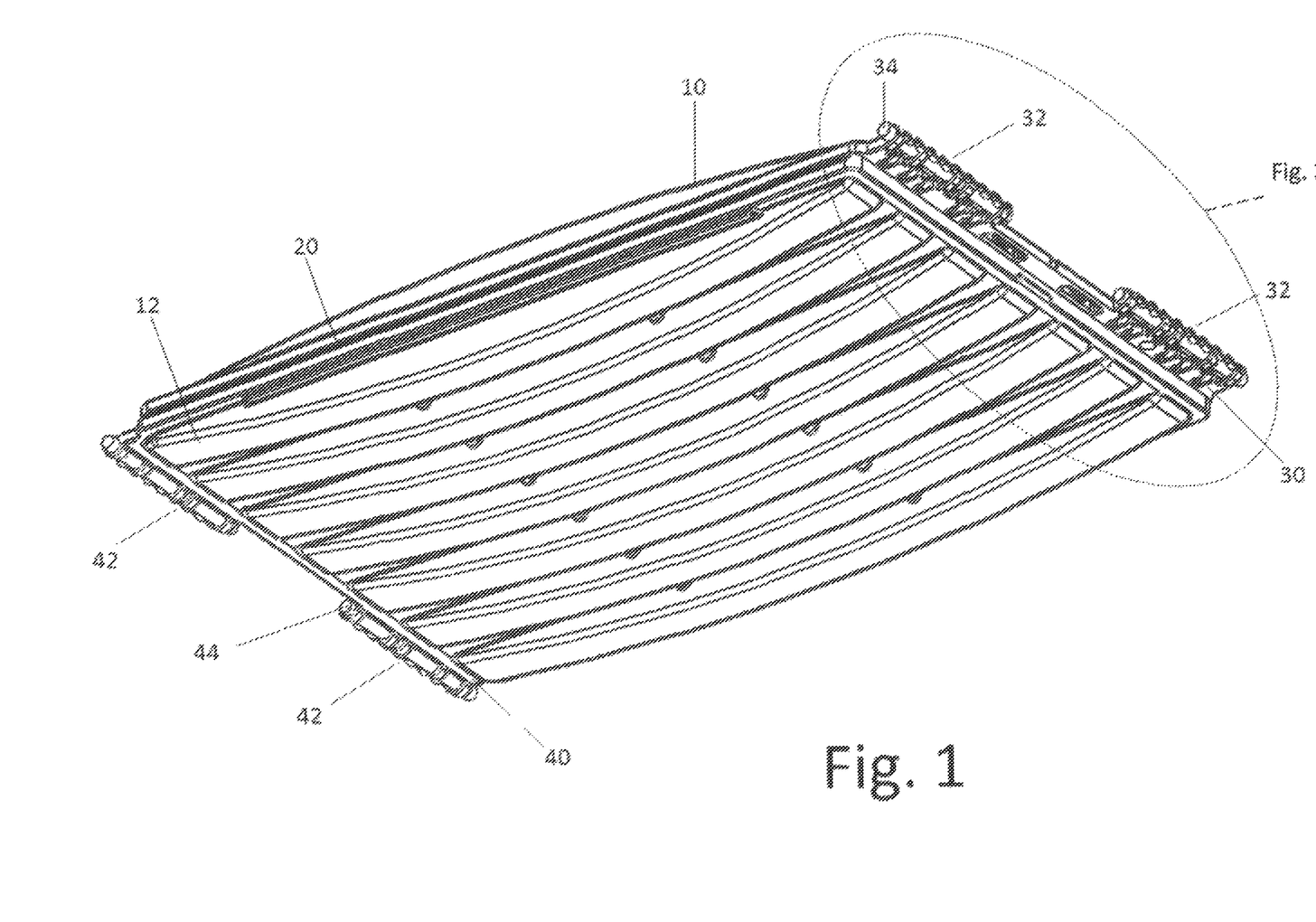
FIG. 1 depicts a perspective view of an embodiment of the product with two parts as formed.
Figure 2:
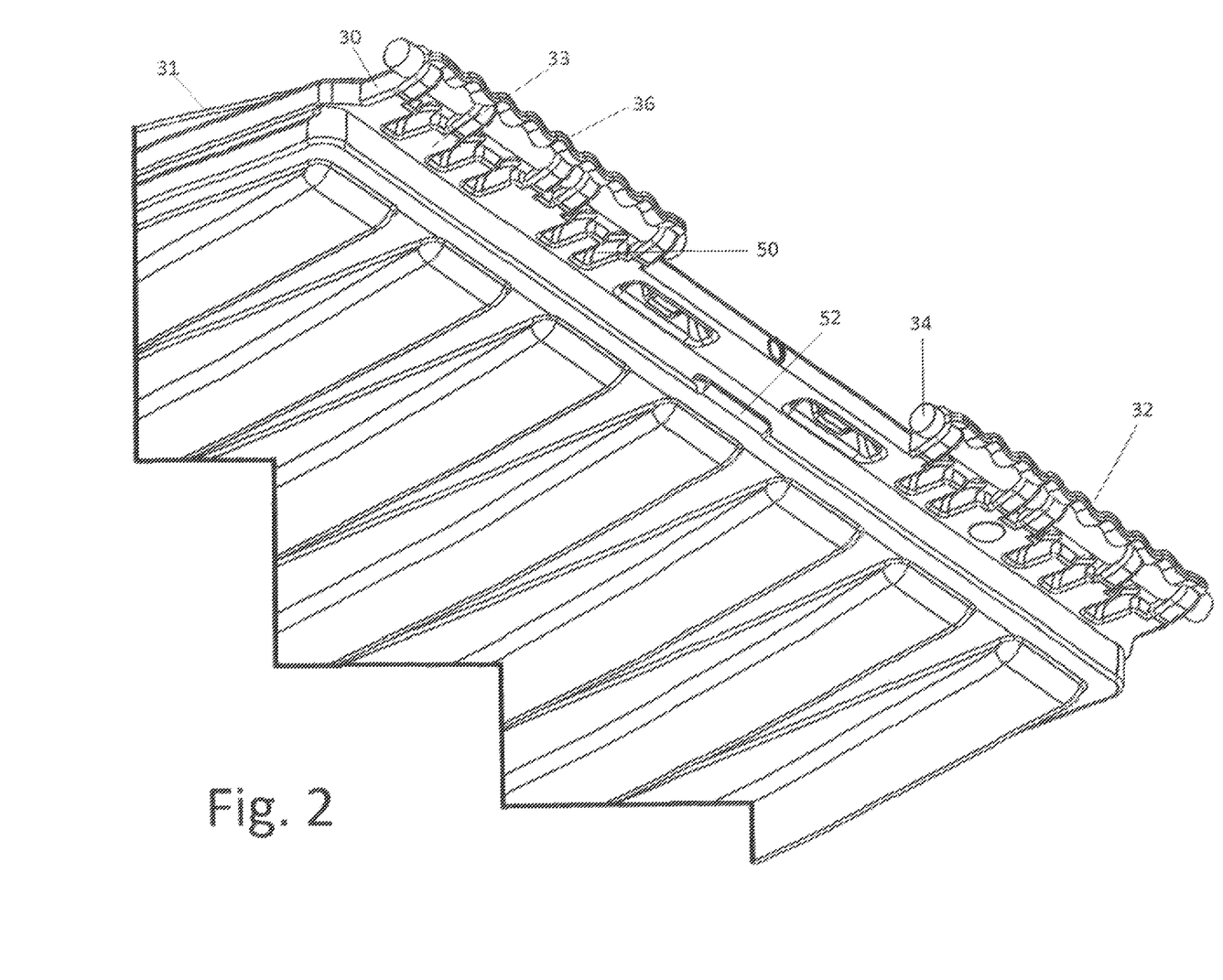
FIG. 2 depicts a perspective view of the embodiment shown in FIG. 1.

Referring to FIG. 1 and FIG. 2, the product as formed in the mold is displayed. The product is formed in a manner such that two identical container lids are formed at the same time. The formed product comprises a top lid 10 and a bottom lid 12. The top lid 10 and bottom lid 12 are a hollow-molded section where the top lid 10 is a single-wall and the bottom lid 12 is a single wall. The top lid 10 and bottom lid 12 have a hollow void between the top lid 10 and bottom lid 12. The top lid 10 and bottom lid 12 are connected together at a peripheral seam 20. The top lid 10 can be removed from the bottom lid 12 by cutting along the peripheral seam 20.

The top lid 10 is connected to a right edge 30. The right edge 30 is a hollow-molded section with a top layer and a bottom layer and a void between the top layer and bottom layer. In the embodiment displayed the right edge 30 has two right hollow-molded hinges 32. The right edge 30 may have one or more right hollow-molded hinges 32. The right hollow-molded hinges 32 are disposed laterally from the right edge 30. Each of the right hollow-molded hinges 32 have right knuckles 34 extending along the length of the right hollow-molded hinge 32 and protruding from the right hollow-molded hinge 32. The right knuckles 34 are configured to connect with the container at the container feature. In the preferred embodiment the right knuckles 34 have a substantially circular hollow void extending the length of the right knuckles 34 permitting a metal rod to pass through the center of the right knuckles 34. The right knuckles 34 freely rotate around the metal rod, which is connected to the container, between a closed position and an open position. The right knuckles 34 may have any external size and shape, and the internal void of the right knuckles 34 may be any size and shape, provided that the function of receiving a metal rod is unaffected. In other embodiments the metal rod may form a tight fit within the central void of the right knuckles 34 such that the rod and lid rotate together within a container feature.

The bottom lid 12 is connected to a left edge 40. The left edge 40 is a hollow-molded section with a top layer and a bottom layer and a void between the top layer and bottom layer. In the embodiment displayed the left edge 40 has two left hollow-molded hinges 42. The left edge 40 may have one or more left hollow-molded hinges 42. The left hollow-molded hinges 42 are disposed laterally from the left edge 40. Each of the left hollow-molded hinges 42 have left knuckles 44 extending along the length of the left hollow-molded hinge 42 and protruding from the left hollow-molded hinge 42. The left knuckles 44 are configured to connect with the container at the container feature. In the preferred embodiment the left knuckles 44 have a substantially circular hollow void extending the length of the left knuckles 44 permitting a metal rod to pass through the center of the left knuckles 44. The left knuckles 44 freely rotate around the metal rod, which is connected to the container, between a closed position and an open position. The left knuckles 44 may have any external size and shape, and the internal void of the right left knuckles 44 may be any size and shape, provided that the function of receiving a metal rod is unaffected. In other embodiments the metal rod may form a tight fit within the central void of the left knuckles 44 such that the rod and lid rotate together within a container feature.

Referring to FIG. 2, an enhanced view of the right edge 30 is displayed. The right edge 30 is formed from two layers of plastic as a top layer 31 and a bottom layer 33. The top layer 31 connects to the top layer of the right edge 30 and the bottom layer 33 connects to the bottom layer of the right edge 30. The right edge 30 has one or more tacks 50. Each tack 50 is formed by locally joining the top layer 31 and bottom layer 33. The tack 50 can add strength and stiffness to the hollow-molded right edge 50. The tack 50 increase the strength and resilience of the hollow-molded right edge 50 by allowing it to absorb force transferred from the single-wall lid, preventing the lid from breaking if dropped. The bottom lid 12 is formed with a handle 52 which is any formed shape which may be utilized to lift the container lid. The handle 52 may be formed in any configuration to permit a user to grasp the lid while in use on a container. The handle 52 may be a protrusion as illustrated or may be a void or indentation. Each right hollow-molded hinge 32 has a right protrusion 36. The right protrusion 36 is a solid-molded portion extending laterally from the right knuckle 34 which strengthens the seam which would naturally be formed at the edge of the knuckle without a protrusion. The right protrusion 36 can be any size and shape. The right protrusion 36 may extend the entire length of the right knuckle 34 or only a portion of the right knuckle 34. The right knuckle 34 may have multiple right protrusions 36 extending laterally from the right knuckle 34. The right protrusion 36 may be a rippled shape, such as a wave, as illustrated, or in other embodiments may be other shapes. In the embodiment shown, the rippled shape strengthens the right knuckle 34.

The left edge 40 is connected to the bottom lid 12 and forms a continuous body for the bottom lid 12. The left edge 40 is formed identical to the right edge 30. In addition, the left hollow-molded hinges 42 are identical to the right hollow-molded hinges 32 with knuckles 44 and a left protrusion 46. In this manner the top lid 10 is identical to the bottom lid 40 when separated.

Figure 3:
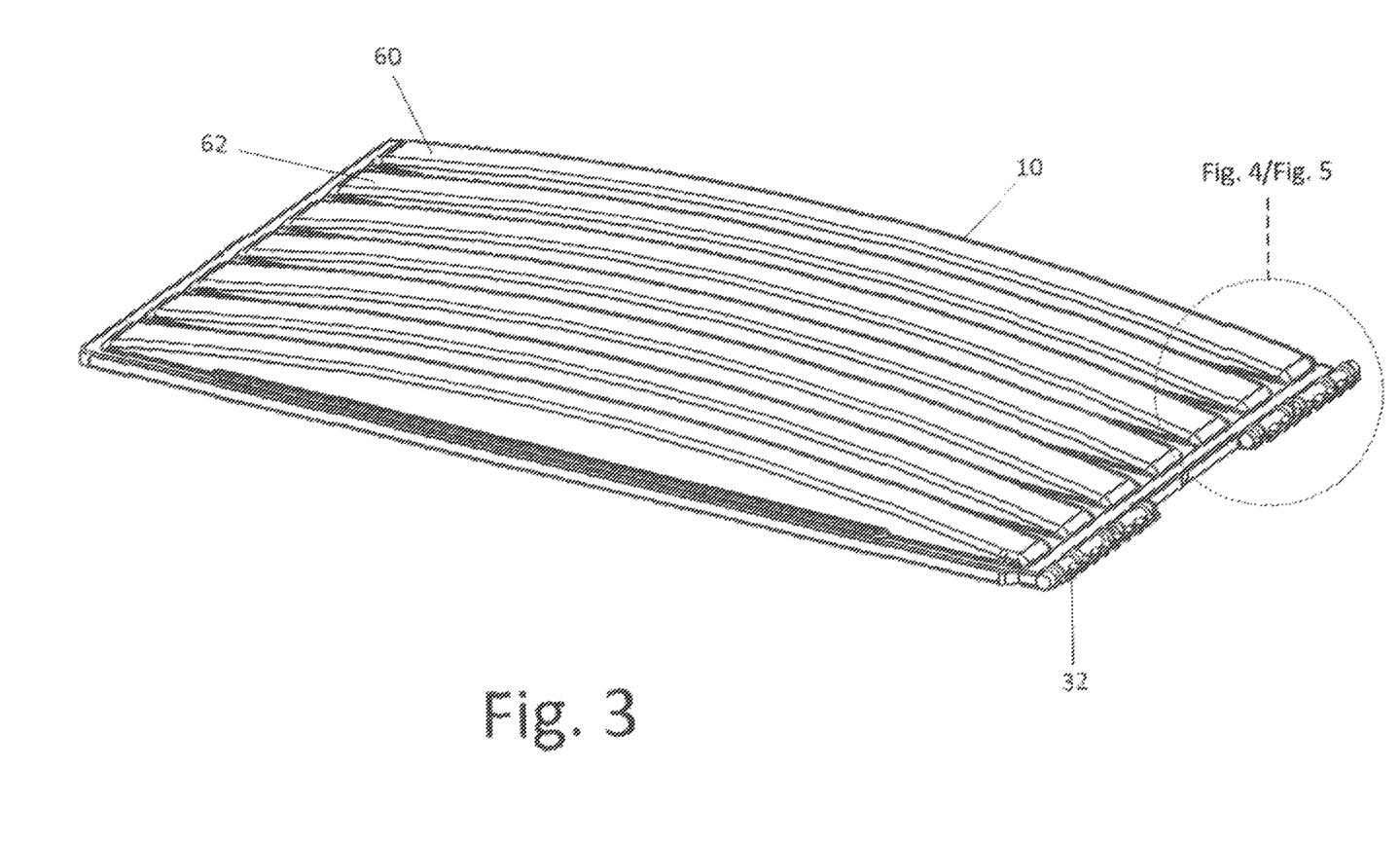
FIG. 3 depicts a perspective view of an embodiment of a single part of the product.

Referring to FIG. 3, the top lid 10 is displayed after separation from the bottom lid 12. The top layer can be crowned, curved, stepped, arched and have various other shapes. The top lid 10 can comprise ribs, projections, lips, troughs, and various other features and combinations thereof. Ribs, projections, lips, troughs, and various other features can be embossed, molded and formed into the cover. Ribs, projections, lips, troughs and various other features can be upstanding from the cover and can be depressed into the cover. As illustrated in FIG. 3 the top lid 10 can have one or more tall ribs 60. In addition, the top lid 10 may have one or more short ribs 62. The tall ribs 60 may be any size and shape. The short ribs 62 may be any size and shape. The tall ribs 60 may extend the entire length of the top lid 10 or a partial length of the top lid 10. The short ribs 62 may extend the entire length of the top lid 10 or a partial length of the top lid 10. In the embodiment displayed the tall ribs 60 and the short ribs 62 alternate so that the short ribs 62 are disposed between the tall ribs 60. The tall ribs 60 extend a greater distance away from the bottom of the top lid 10 than the short ribs 62.

Figure 4:
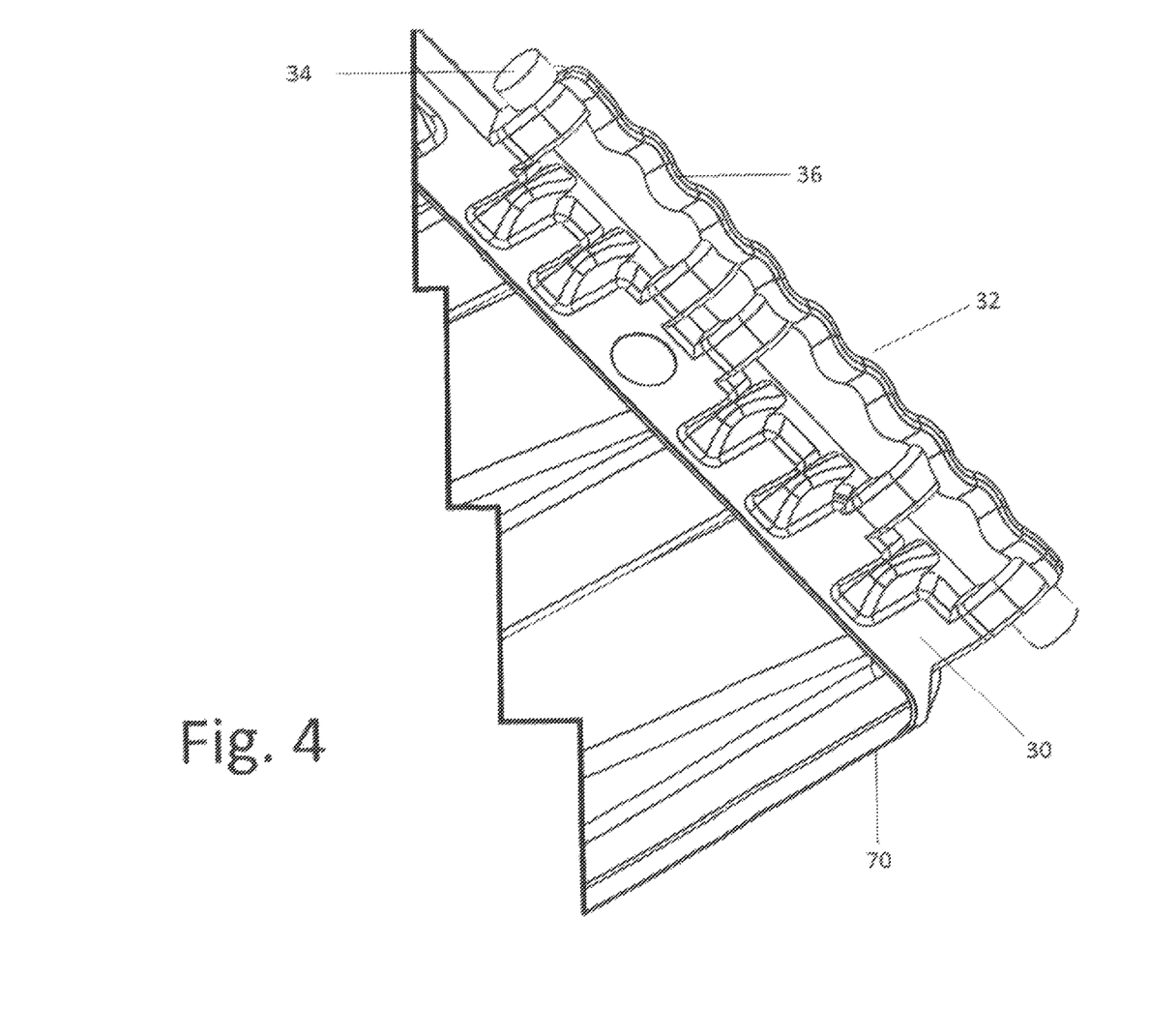
FIG. 4 depicts a perspective view of the embodiment shown in FIG. 3.

Referring to FIG. 4 a bottom view of the top lid 10 is illustrated after the top lid 10 is separated from the bottom lid 12. As shown in FIG. 4, the top lid 10 has a peripheral rim 70. The peripheral rim 70 is a single wall of plastic extending downward from the top lid 10. The peripheral rim 70 may have a lip extending horizontally inward from the peripheral rim 70. In other embodiments the peripheral rim 70 has no lip and terminates into an edge at the peripheral rim 70. The peripheral rim 70 is disposed adjacent to the bottom layer 33 of the right edge 30.

Figure 5:
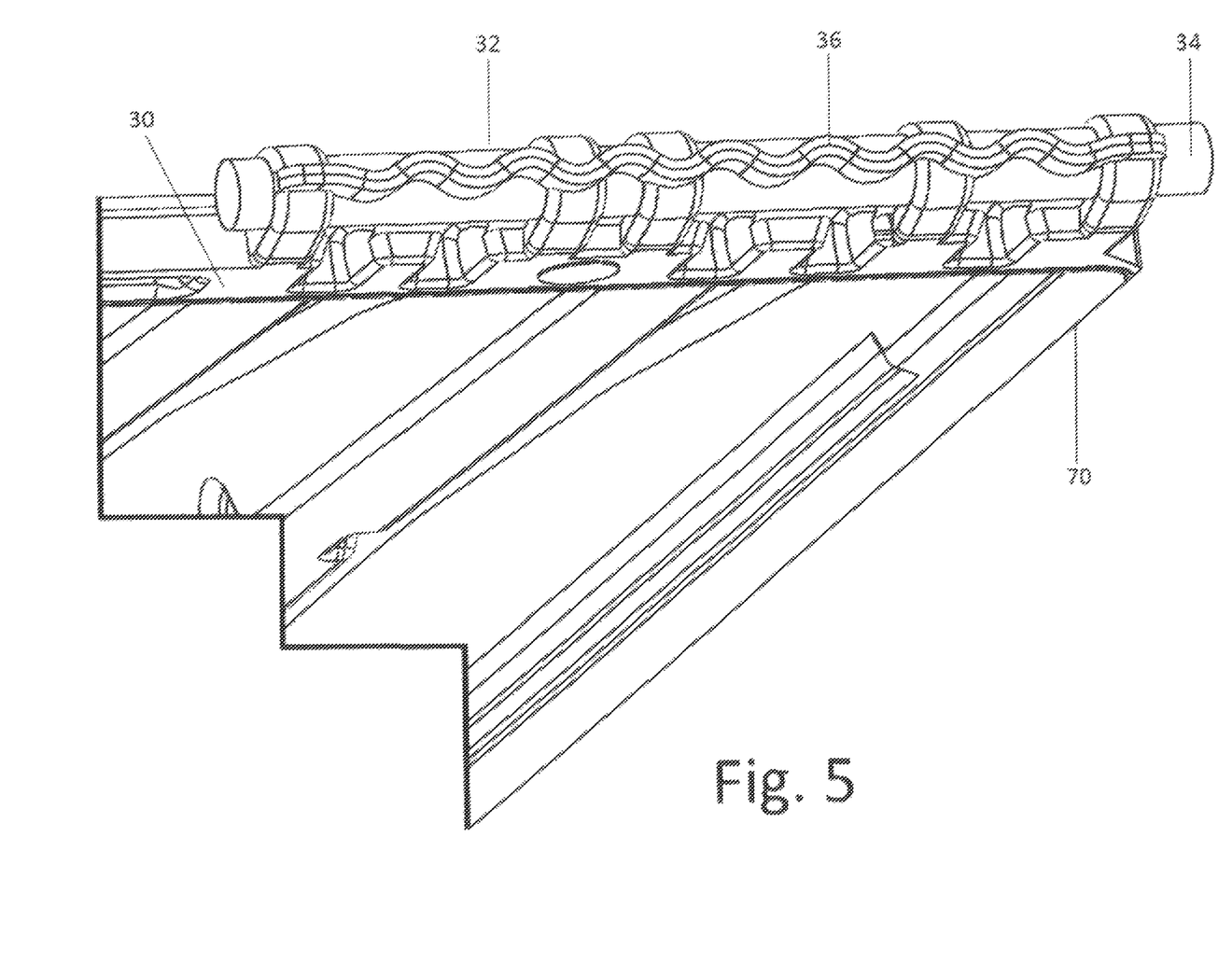
FIG. 5 depicts a view of a hinge on the product.

Referring to FIG. 5 a view of the right hollow-molded hinge 32, right knuckle 34, and right rippled protrusion 36.

The right rippled protrusion 36 extends from the right knuckle 34 to the side opposite from the right edge 30. The right rippled protrusion 36 is a projection shaped into a wave form. The right rippled protrusion 36 is solid-molded and provides enhanced strength and resilience to the right knuckle 34.

Figure 6:
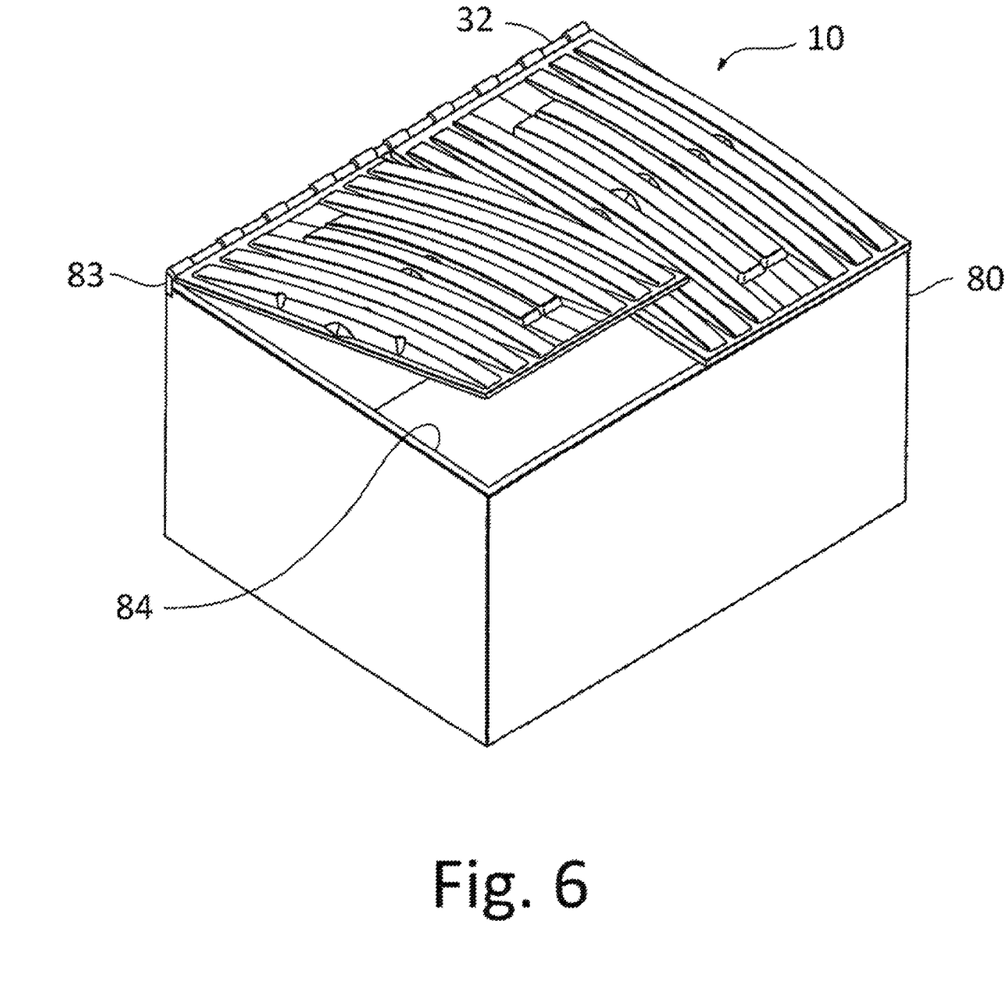
FIG. 6 depicts a perspective view of an embodiment of the product in use on a container.

Referring to FIG. 6, the container lid 10 in use on the container 80 is displayed. In use, as the product rotates, the hollow-molded hinge 32 supports at least part of the product and prevents the product from separating from the container 80. The hollow-molded hinge 32 provides increased strength, stiffness, and durability where the product pivotally connects to the container.

Figure 10A:
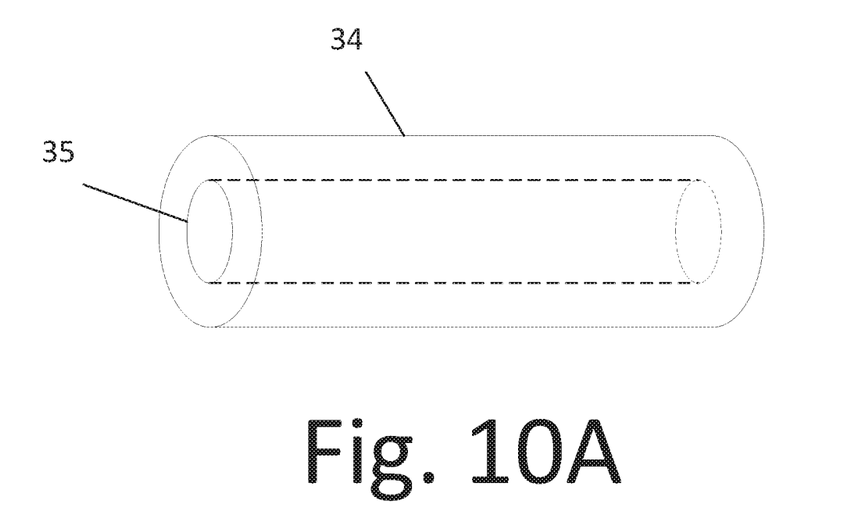
FIG. 10A is a perspective view of an elongate pin
Figure 10B:
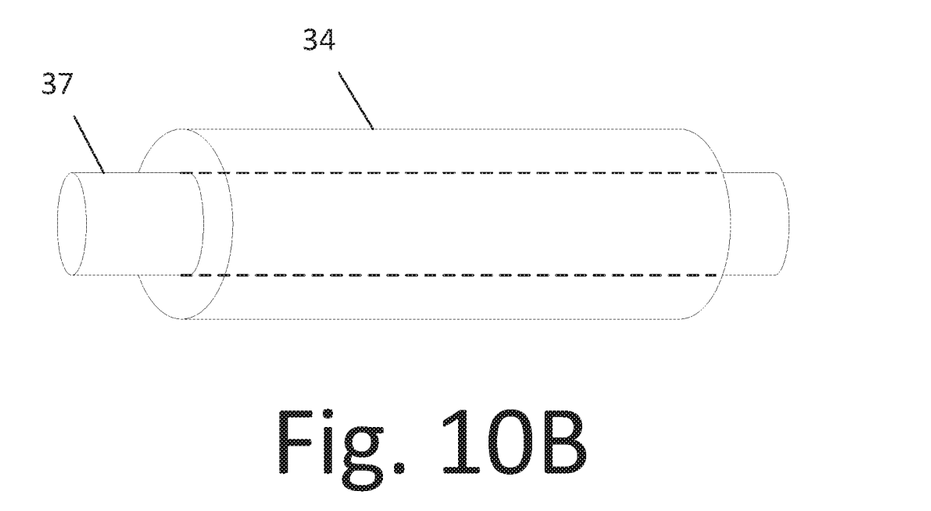
FIG. 10B is a perspective view of an elongate pin with a container feature.

The elongate knuckle of the hollow-molded hinge pivotally connects to the container 80 via a container feature. The container feature interacts with the hinge to enable the lid to rotate between the open position and the closed position. The hollow-molded hinge 32 pivotally connects to the container 80 by connecting to the knuckle 34. The hollow-molded hinge 32 enables the product to pivot between the open position and the closed-position. Alternate embodiments of the hollow-molded hinge 32 can pivotally connect to the container in various ways. In another embodiment, as illustrated in FIG. 10A and FIG. 10B, the elongate knuckle 34, being hollow-molded, has a substantially circular void 35 extending through the length of the elongate knuckle 34. A metal pivot rod 37 is threaded through the substantially cylindrical void 35 and extends beyond the length of the elongate knuckle 34. The metal pivot rod 37 pivotally connects to the container 80 via a container feature. The metal pivot rod 37 may pivot within the container feature or the elongate knuckle 35 may pivot about the metal pivot rod 37. A pin-shaped hollow-molded hinge embodiment can pivotally connect to the container by penetrating a container feature. For example, the pin-shaped hinge can penetrate the hinge ear 83 substantially coaxially. The container feature can be fixed to the container or the container feature can be free to rotate with the hollow-molded hinge 32. The container feature can be connected to the container via an intermediate connecting feature and by more than one intermediate connecting feature. Other embodiments of the product can utilize various types of hollow-molded hinge so long as the hinge pivotally connects the product to the container and enables the product to pivot between the open position and the closed position. When the container lid 10 is in the open position, the container opening 84 is uncovered permitting a person access to the interior space of the container 80. When the container lid 10 is in the closed position, the container lid 10 obstructs the container opening 84.

In some embodiments the top lid 10 can have standoffs. Standoffs can provide spacing when multiple products are stacked for shipping. Standoffs can prevent adjacent products from locking together when they are stacked for shipping.

The method of the invention combines solid-molding and hollow-molding into a single unitary process. As used here and throughout, unitarily molded means that the solid-molded components of the product and the hollow-molded components of the product are manufactured in a single molding operation and in a single mold.

Solid-molding as used here and throughout, refers to a molding process characterized by introducing plastic into a solid-mold cavity and then causing the plastic to substantially wholly fill the solid-mold cavity.

Various means can be utilized to cause the plastic to wholly fill the solid-mold cavity. For example, a piston can be used to force the plastic into the solid-mold cavity. The piston can be moved by mechanical linkage, by pressurized gas, and various other movers. Alternatively, the plastic can be liquefied and poured into the solid-mold cavity, thereby using gravity to cause the plastic to fill the solid-mold cavity. Alternatively, the solid-mold cavity can be made smaller after the plastic is introduced into the solid-mold cavity. As the solid-mold cavity is made smaller, the plastic is caused to fill the remaining solid-mold cavity. Various other means for causing the plastic to substantially wholly fill the solid-mold cavity can be used.

Hollow-molding as used here and throughout, refers to a molding process characterized by introducing plastic into a hollow-mold cavity having a hollow-mold cavity surface and then causing the plastic to substantially wholly coat a hollow-mold cavity surface with a plastic layer having a wall thickness. In the hollow-molding process, the hollow-mold cavity surface is coated with the plastic layer, as compared to the solid-molding process where the solid-mold cavity is filled with plastic.

In the hollow-molding process, the hollow-mold cavity, except where the plastic layer coats the cavity surface, can contain air and other gasses. The air and other gasses can be pressurized. The hollow-molding process can utilize pressurized gas to cause the plastic to coat the hollow-mold cavity surface. The hollow-molding process can utilize pressurized gas to hold the plastic layer in place against the hollow-mold cavity surface. Alternatively, the hollow-molding process can utilize rotation to generate centripetal forces in the plastic, causing the plastic to coat the hollow-mold cavity surface and holding the plastic layer in place against the hollow-mold cavity surface.

Alternatively, the hollow-molding process can utilize other means to cause the plastic to coat the hollow-mold cavity surface, and can utilize combinations of the aforementioned means and various other means to cause the plastic to coat the hollow-mold cavity surface.

The hollow-molding process can produce components with hollow cross-sections. The hollow-molding process can produce features like undercuts, reverse curved surfaces, and closed, box-structures that can be difficult and expensive to produce with the solid-molding process.

The hollow-molded component can utilize internal ribs, walls, troughs, and various other features that increase the strength and rigidity of the part without significantly increasing weight. Similar features can be difficult and expensive to produce with the solid-molding process.

The method of the invention comprises a plastic inserting step for introducing plastic into a mold. The mold comprises a mold cavity. The mold cavity further comprises a solid-mold cavity and a hollow-mold cavity. The hollow-mold cavity comprises a hollow-mold cavity surface.

The plastic inserting step can be various methods for introducing plastic into the mold. For example, the plastic can be inserted into the mold by opening the mold and placing the plastic into the mold. The plastic can be inserted into an alternate location connected to the mold and then inserted into the mold by various mechanical means; for example, inserted via piston, pressurized gas, spring, and other means and combinations thereof.

Alternatively, the plastic can be introduced into the mold via gravity and other means. The inserting step of the method can occur concurrently with other steps of the method.

The method further comprises a layering step. The layering step causes the plastic to substantially wholly coat the hollow-mold cavity surface. The layering step can utilize various means for causing the plastic to coat the hollow-mold cavity surface. For example, the various means utilized by the aforementioned hollow-molding process can be utilized in the layering step. The layer step of the method can occur concurrently with other steps of the method.

Figure 7:
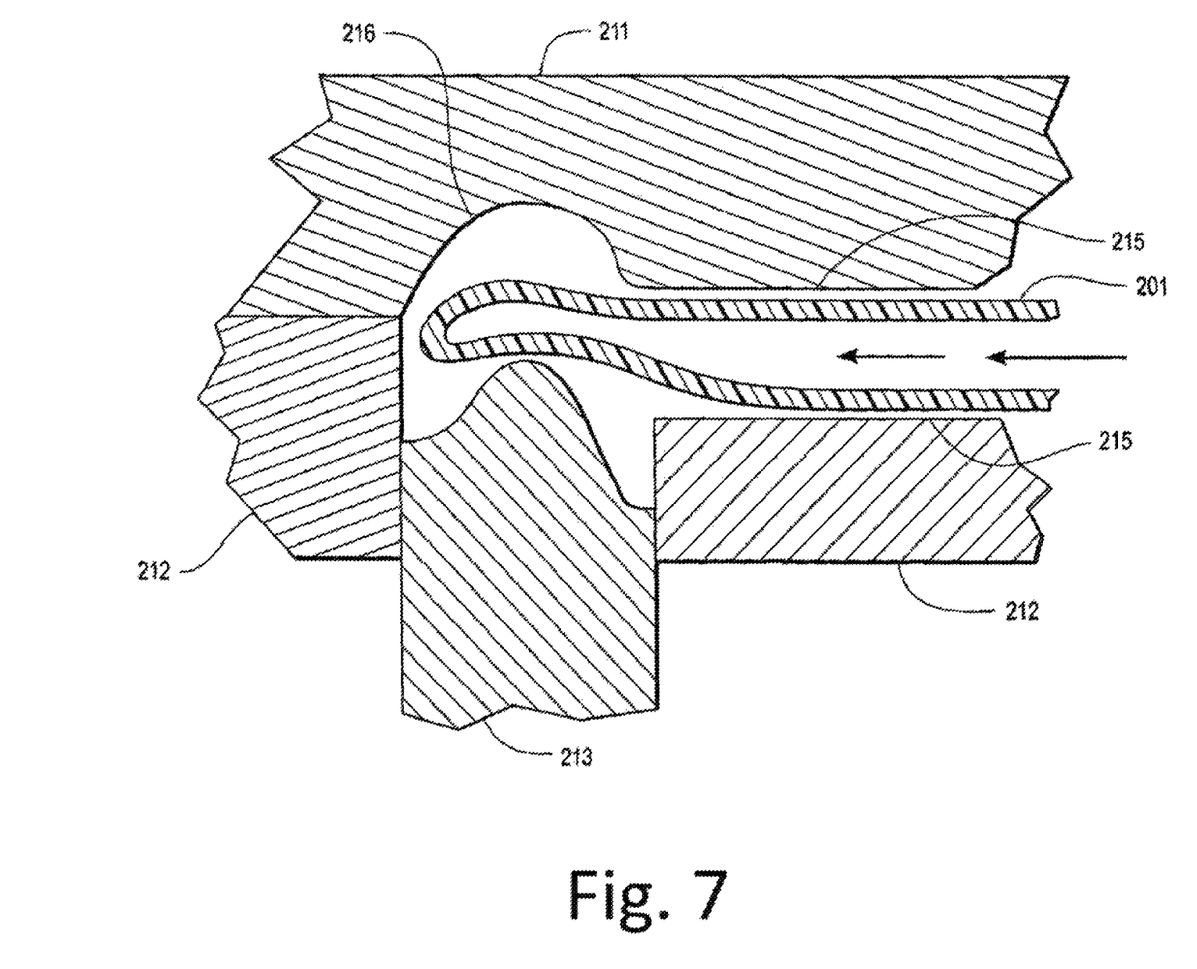
FIG. 7 is a section view depicting a step of the method of the invention.

In the embodiment shown in FIG. 7, pressurized gas is used to cause the plastic to substantially wholly coat the hollow-mold cavity surface 215 with a plastic layer 201. The method further comprises a solidifying step where the plastic is caused to substantially wholly fill the solid-mold cavity. The solidifying step can utilize various means for causing the plastic to fill mold cavity. For example, the various means utilized by the aforementioned solid-molding process can be utilized in the solidifying step. The solidifying step of the method can occur concurrently with other steps of the method.

Figure 8:
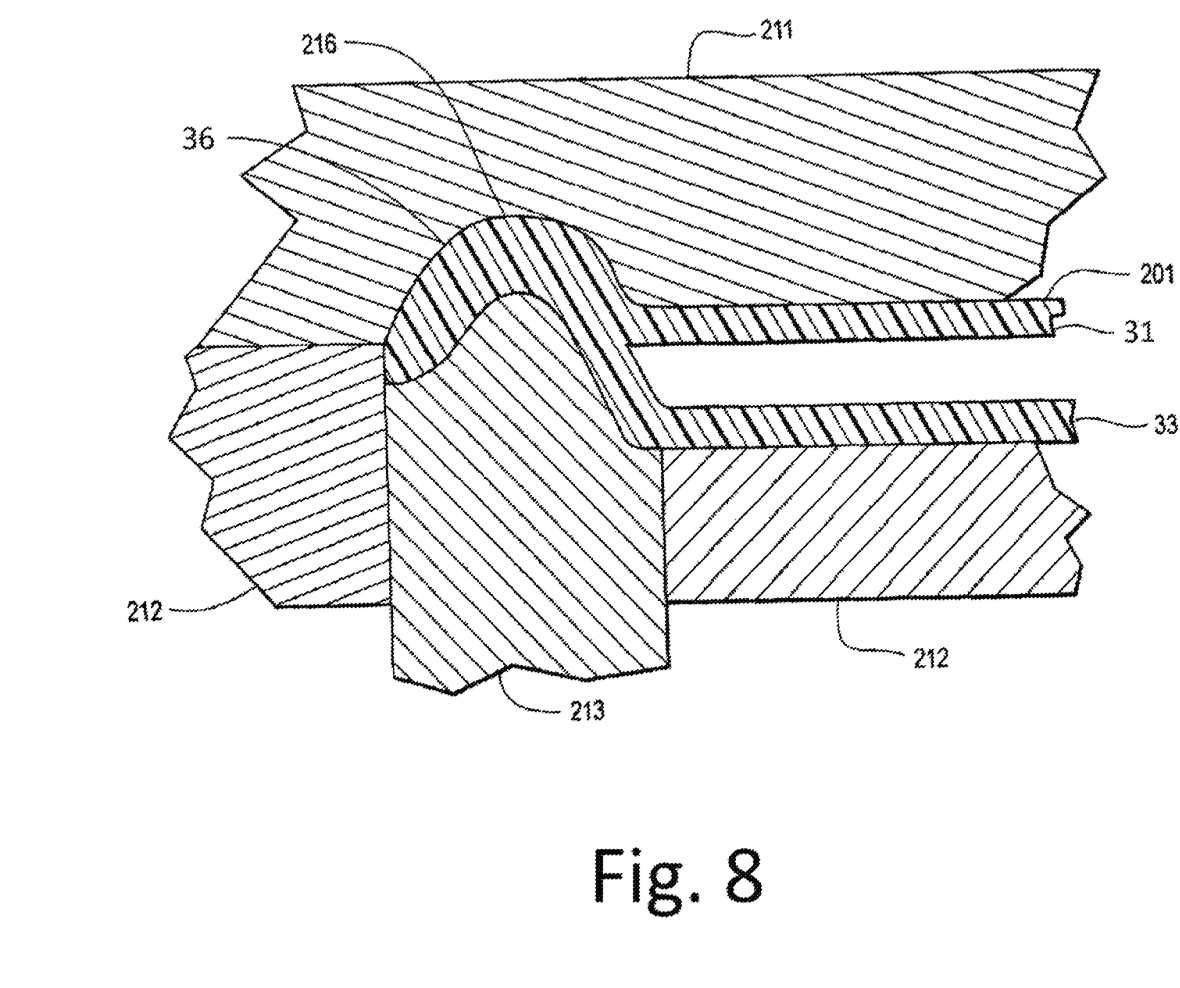
FIG. 8 is a section view depicting a step of the method of the invention.

As shown in FIG. 7 the mold can further comprise a movable mold 213 having a retracted position and an inserted position. As shown in FIG. 7 the movable mold 213 is in the retracted position. As shown in FIG. 8 the movable mold 213 is in the retracted position. The solid-molded protrusion 36 of the hollow-molded hinge 32 is formed when the movable mold 213 moves to the inserted position and causes the mold cavity to become smaller. The top layer 31 and the bottom layer 33 extend outwards from the hollow-molded hinge with solid-molded protrusion 216. The top layer 31 and the bottom layer 33 are separated by a void.

The method of the invention can include forming a tack 50 within the hollow-molded right edge 30. Tacks 50 within the hollow-molded cover can further stiffen and strengthen the hollow-molded cover without significantly increasing weight and material consumption. The mold can further comprise a tack mold for molding tacks within hollow-molded cover. The tack mold has a tack-retracted position and a tack-inserted position.

Figure 9:
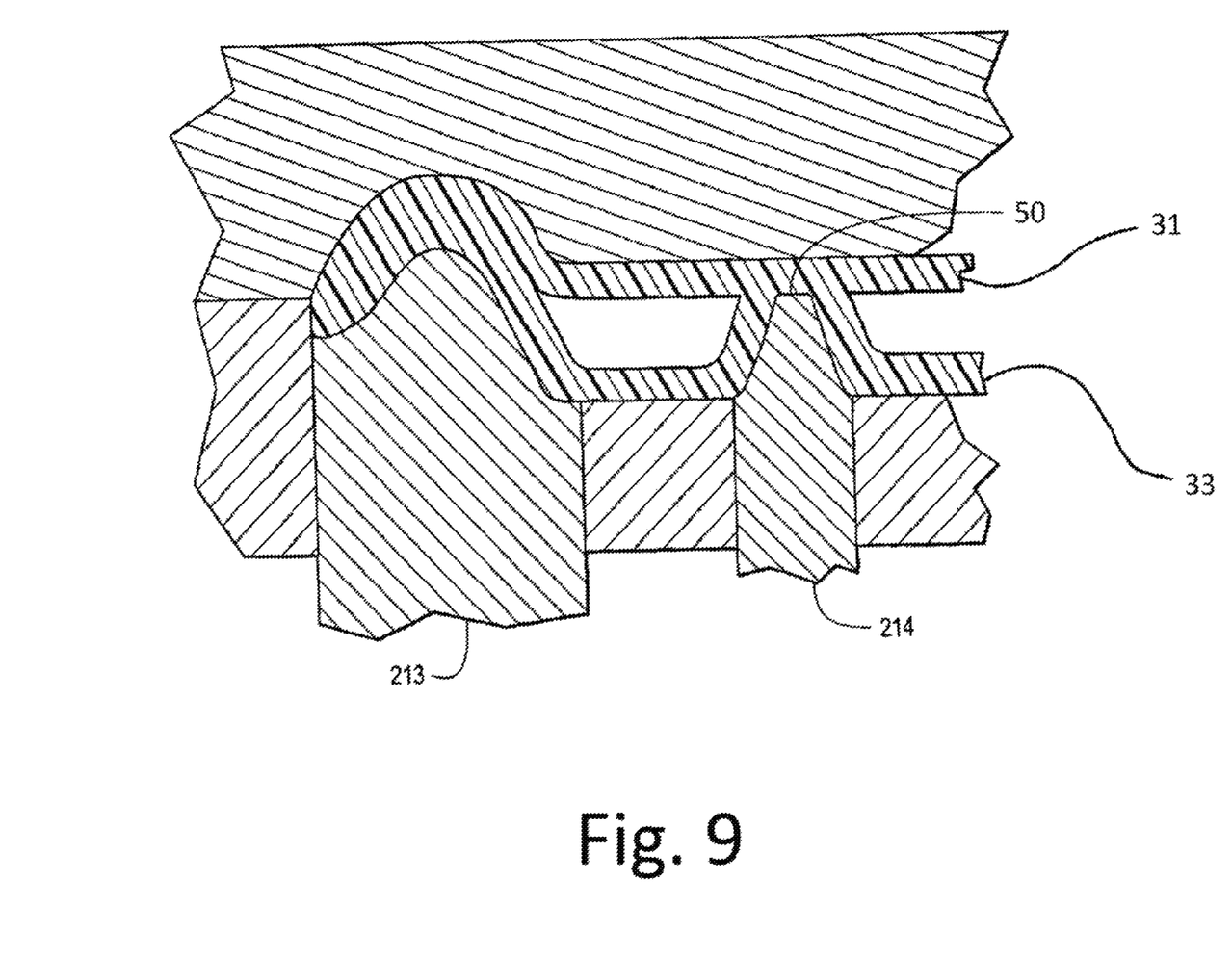
FIG. 9 is a section view depicting a step of the method of the invention.

In the embodiment shown FIG. 9, the method of the invention utilizes the movable mold 213 and the tack mold 214. The movable mold 213 is shown in the inserted position and the tack mold 214 is shown in the tack-inserted position. The tack 50 is formed when the tack mold 214 moves to the tack-inserted position and causes the cover top layer 31 and the cover bottom layer 33 to join proximal the tack mold 214.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A unitarily molded container lid comprising:
a single wall section;
a double wall section comprising:
   a top layer; and
   a bottom layer; the bottom layer being substantially opposite the top layer, and a void separating the top layer and the bottom layer;
   one or more solid molded tacks connected to the top layer and the bottom layer, wherein the solid molded tacks comprise two outer walls and a space between the two outer walls completely filled with plastic; and
   one or more tubular hinges comprising one or more hinge knuckles, and one or more solid molded protrusions connecting one or more hinge knuckles, connected to the container lid; wherein the solid molded protrusions comprise two walls and a space between the two walls completely filled with plastic.

2. The container lid of claim 1, wherein the one or more protrusions comprise one or more wave-shaped sections.

3. The container lid of claim 1, wherein two container lids of claim 1 are made simultaneously by a hollow-molding process.

4. The container lid of claim 3, wherein the two container lids are connected at a peripheral rim.

5. The container lid of claim 3, wherein two solid molded hinges are offset on top and bottom lids respectively which bottom lids share a single wall center wherein the solid molded hinges comprise two outer walls and a space between the two outer walls completely filled with plastic.

6. The container lid of claim 1, wherein the container lid further comprises a peripheral rim with a lip.

7. The container lid of claim 1, wherein a plurality of ribs extend the length of the single wall section.

8. The container lid of claim 1, wherein one or more solid molded tacks extend from the peripheral rim.

* * * * *